165-46
-/5/87 03 - 000,262

United States Statutory Invention Registration [19]

[11] Reg. Number: H262

[43] Published: May 5, 1987

Yunker et al.

[54] METHOD OF AND APPARATUS FOR REMOVING SILICON FROM A HIGH TEMPERATURE SODIUM COOLANT

[75] Inventors: Wayne H. Yunker, Richland; David W. Christiansen, Kennewick, both of Wash.

[73] Assignee: The United States of America as represented by the United States Department of Energy, Washington, D.C.

[21] Appl. No.: 554,867

[22] Filed: Nov. 25, 1983

[51] Int. Cl.[4] ..... C21B 7/10

[52] U.S. Cl. ..... 266/46; 75/66; 423/324; 423/332; 423/641; 23/295 R; 266/204; 266/227; 266/233; 266/161; 422/245; 422/205; 165/109.1; 165/145; 165/163

[58] Field of Search ..... 62/532, 537, 544, 541; 75/66, 63; 210/737, 738, 774, 787, 788, 789; 376/310, 312

[56] References Cited

U.S. PATENT DOCUMENTS

| | | | |
|---|---|---|---|
| 2,879,157 | 3/1959 | Batutis et al. | 75/66 |
| 3,600,155 | 8/1971 | De Vries et al. | 75/66 |
| 3,693,959 | 9/1972 | Shinhoe et al. | 376/312 |
| 3,831,912 | 8/1974 | Shimoyashiki et al. | 266/22 |
| 3,962,082 | 6/1976 | Hundal | 210/71 |
| 3,966,445 | 6/1976 | Adams | 62/58 |
| 4,017,306 | 4/1977 | Batoux et al. | 75/66 |
| 4,021,234 | 5/1977 | Nei et al. | 75/66 |
| 4,102,765 | 7/1978 | Fey et al. | 204/164 |
| 4,191,558 | 3/1980 | Gould | 75/66 |
| 4,239,740 | 12/1980 | Harvey et al. | 423/350 |
| 4,332,031 | 5/1982 | Barkatt et al. | 376/313 |
| 4,511,398 | 4/1985 | Kugler | 75/63 |

OTHER PUBLICATIONS

Liquid Metals Handbook, Sodium-NaK-Supplement, Jun. 1955, pp. 94–113 ("Purity and Purification", Mausteller et al).

Liquid Metals Technology, Part 1, Chem. Eng. Progress Symp. Series, No. 20, 1957, vol. 53 ("Sampling and Analysis . . . ", Humphreys).

*Primary Examiner*—John F. Terapane
*Assistant Examiner*—Susan Wolffe
*Attorney, Agent, or Firm*—Robert Southworth, III; Judson R. Hightower

[57] ABSTRACT

A method of and system for removing silicon from a high temperature liquid sodium coolant system for a nuclear reactor. The sodium is cooled to a temperature below the silicon saturation temperature and retained at such reduced temperature while inducing high turbulence into the sodium flow for promoting precipitation of silicon compounds and ultimate separation of silicon compound particles from the liquid sodium.

18 Claims, 8 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF AND APPARATUS FOR REMOVING SILICON FROM A HIGH TEMPERATURE SODIUM COOLANT

BACKGROUND OF THE INVENTION

The present invention relates generally to removing impurities from a nuclear reactor coolant and, more particularly, for removing silicon from the sodium utilized as a coolant in fast breeder nuclear reactors. The United States Government has rights in this invention pursuant to Contracts Nos. EY76-C-14-2170 and DE-AC006-76FF02170 between the U.S. Department of Energy and the Westinghouse Electric Corporation.

A typical fast breeder nuclear reactor employs liquid sodium as a coolant to remove the tremendous heat generated by the nuclear fission of the fissile materials. The liquid sodium is circulated through a closed heat transport system which includes the reactor vessel, a heat exchanger, a suitable piping system for serially connecting these components together, and a pump for circulating the coolant therethrough. During operation of the nuclear reactor, various contaminants or impurities formed by reactions occurring in and with the liquid metal coolant become entrained or dissolved in the liquid sodium. These impurities may be transported around the loop system and can result in corrosion of the system or in the formation of solid precipitates which can cause plugging and other deleterious effects within the system. In order to remove some of these impurities, cold traps have been designed and incorporated in these liquid metal cooling systems. Cold trapping is a technique for producing precipitation or nucleation of the impurities under reduced temperature conditions in a controlled manner to thereby purify the liquid metal coolant.

The chemical element silicon has been known to be one of several trace impurities in sodium loop systems. However, because of its minor incidence in some cold trap deposits, and because of the instability of some silicon compounds inside a metallic sodium environment, it has not been considered a significant detriment in the operation of sodium heat transport systems. Recently, however, studies have shown that, contrary to what had been earlier believed, silicon mass transport is responsible for deposits within sodium heat transport systems, particularly new systems, that can have severe effects on the operation of such systems.

The chemical element silicon is normally found in iron and steel. In the 300 Series stainless steels used in fuel cladding, piping and other internal components of liquid metal fast breeder reactors, the silicon content is about 0.5 percent by weight. This silicon leaches out of the sodium-wetted surface of new stainless steel and dissolves in the sodium at temperatures greater than 900° F. In cooler portions of the sodium coolant system, this dissolved silicon will be deposited in the form of a crystalline compound. These deposits create increased hydraulic friction and resistance to coolant flow with consequent increased coolant pressure drops. Also, they can contribute dramatically to losses in the heat transfer rate. Moreover, particulates resulting from this crystalline growth break away to clog flow control valves, filters and other narrow circulation passages. All of the above factors contribute to increased pressure drops and reduced cooling efficiencies resulting in the overloading of pumps and other components. The usual cold trapping techniques mentioned earlier, and which are normally provided in liquid metal coolant systems, have not proved effective to collect or remove the silicon as they are operated at too low a temperature. Further, particulates which enter them tend to be recycled and to dissolve in the circulating coolant when conveyed through the higher temperature regions of the system.

It is therefore a primary object of the present invention to obviate the above shortcomings by providing a new and useful method of and system for efficiently removing silicon from a liquid metal coolant system.

It is another object of this invention to provide a method of promoting the precipitation of silicon compounds in a controlled manner and environment for subsequent removal from a liquid metal coolant system.

It is still another object of the present invention to provide a new and useful system for facilitating precipitation in the foregoing method by enhancing the deposition and growth of silicon compound crystals on collection surfaces of the system where they grow to a size which is efficiently removed.

It is a further object of this invention to provide in the foregoing system a new and useful composite, integral apparatus for cooling high temperature sodium below the silicon saturation temperature as well as promoting the precipitation of silicon compound crystals.

These and other objects, advantages, and characterizing features of the present invention will become clearly apparent from the ensuing detailed description of an illustrative embodiment thereof, taken together with the accompanying drawings wherein like reference characters denote like parts throughout the various views.

SUMMARY OF THE INVENTION

A method of and system for materially reducing the silicon inventory in a liquid sodium coolant system of a nuclear reactor or other liquid sodium systems. The high temperature sodium containing dissolved silicon is cooled below the saturation temperature of silicon and maintained at such reduced temperature while inducing high turbulence in the sodium flow to promote precipitation of the silicon. The solid silicon particulates resulting from such precipitation are then separated and removed from the liquid sodium.

DETAILED DESCRIPTION OF THE PREFERRED EMBODIMENT

Figure 1:
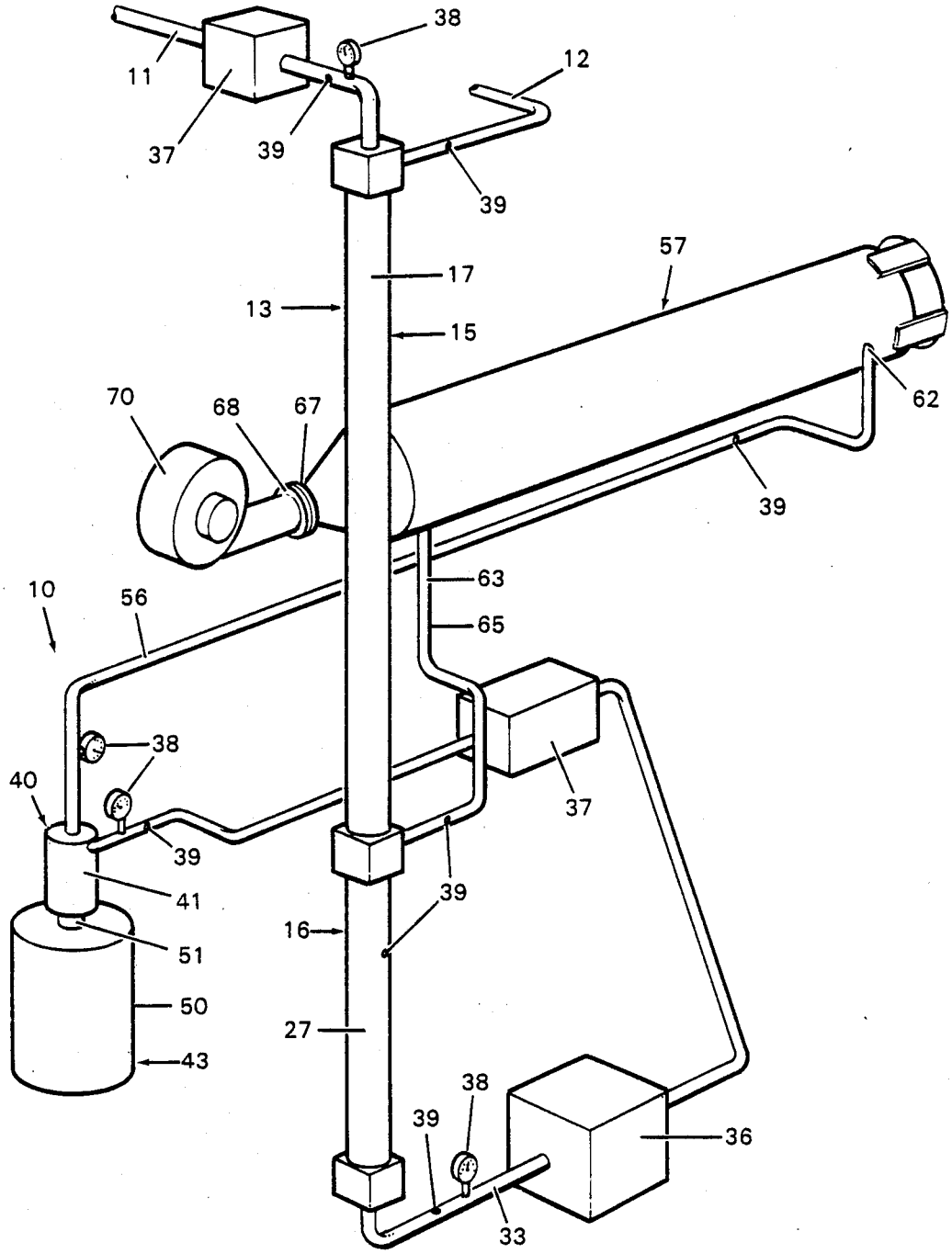
FIG. 1 is a schematic flow diagram of a portion of a liquid metal coolant system incorporating a preferred form of the silicon removal system of this invention.

Referring now in detail to the illustrative embodiment depicted in the accompanying drawings, there is schematically shown in FIG. 1 a system, comprehensively designated 10, of the present invention for removing silicon entrained and dissolved in a liquid metal coolant, such as sodium for example, which is employed in the heat transport system of a nuclear reactor. As is well known, the primary reactor coolant, liquid sodium, is heated to extreme temperatures on passage through the core of a nuclear reactor containment vessel. This hot liquid sodium flows through the primary system to a heat exchanger for transferring heat from the primary system to another or secondary coolant system coupled in sealing arrangement with the primary system for ultimate conversion into steam in order to generate electrical energy.

The system 10 includes an inlet conduit 11 and an outlet conduit 12 tapped into the primary coolant system in a high temperature zone since the solubility of silicon in sodium increases with increases in temperature. The temperature of the liquid sodium should be above the silicon saturation temperature, which is that temperature for any particular, but arbitrary, concentration of silicon dissolved in sodium at which there would be a thermodynamic equilibrium between the dissolved silicon and a solid phase containing silicon. The silicon saturation temperature of sodium depends upon the system design, operation and operating history, and can vary from a low sodium melting point temperature to a maximum temperature as dictated by the mass of silicon dissolved in the sodium. For illustrative purposes in describing the silicon removal system of this invention, it will be assumed that the temperature of the sodium entering conduit 11 is 1000° F. and that the silicon saturation temperature is 900° F.

Means are provided in system 10 to cool the entrant hot liquid sodium below the silicon saturation temperature and to promote precipitation in the form of crystal growth of silicon compounds on the walls of the flow channels in a controlled manner and predominantly at a desired location. To this end, such means comprise a composite economizer/crystallizer unit or apparatus 13 having an upper economizer or heat exchange portion 15 serving to reduce the temperature of the hot sodium and a lower crystallizer portion 16 effective to promote precipitation. The terms upper, lower, top, bottom, vertically, horizontally and the like as used herein are applied only for convenience of description with reference to the drawings and should not be taken as limiting the scope of this invention.

Figure 2:
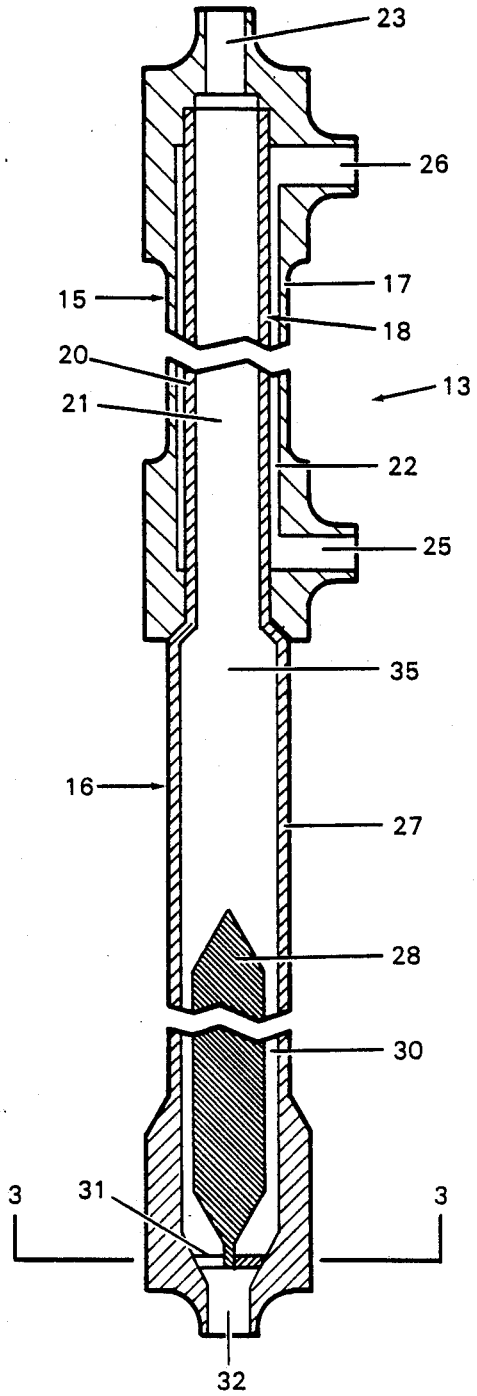
FIG. 2 is a longitudinal sectional view of a preferred form of composite economizer/crystallizer apparatus forming a part of this invention.
Figure 3:
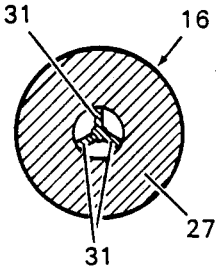
FIG. 3 is a cross-sectional view, taken along line 3—3 of FIG. 2.

As shown in FIG. 2, the economizer portion 15 comprises an elongated, outer cylindrical shell 17 and an elongated, hollow inner tube 18 concentric with the shell 17 and defined by a cylindrical wall 20 in radially spaced relation to the wall of shell 17. The inner tube 18 defines an axial passage 21 and the space between shell 17 and tube 18 an annular passage 22. The upper end of tube 18 is provided with a hot sodium inlet 23 connected to conduit 11 and the bottom end thereof is formed integral with the upper end of the crystallizer portion 16 so as to minimize turbulence in the sodium passing from one to the other. The lower end of shell 17 is formed with a return inlet 25 and the upper end thereof is formed with an outlet 26. Thus, hot liquid sodium entering inlet 23 flows through passage 21 in heat exchange relation with the cooler sodium passing upwardly through annular passage 22 for cooling the hot sodium to a desired temperature range below the silicon saturation temperature.

The crystallizer portion 16 of apparatus 13 comprises an elongated, hollow tube 27 forming an axial extension and a continuation of the inner tube 18. A solid core member 28 is concentrically mounted within the lower portion of tube 27 to define an annular restricted passageway 30 between the tube 27 and core member 28. While the core member 28 is shown supported and secured within the tube 27 by means of radially extending circumferentially spaced ribs 31 having adequate spaces or openings therebetween, it should be appreciated that many mechanical expedients for supporting core member 28 within tube 27 could be expected to occur to those skilled in the art. The lower end of tube 27 is provided with an outlet 32 connected to a conduit 33 (FIG. 1).

In order to realize optimum precipitation via crystal formation and growth, it has been found desirable to maintain the temperature of the cooled sodium exiting passage 21 at a desired range below the sodium saturation temperature for a finite time and to subsequantly increase the velocity of sodium flow for inducing high turbulence to enhance rapid silicon compound deposition on the inner wall surfaces of tube 27. To this end, the empty region in tube 27 above the core member 28 defines a chamber to provide a generally low velocity flow region 35 affording the desired retention time and the passageway 30 defines a high velocity flow region for inducing high turbulence in the sodium flow to increase the rate of mass transfer of silicon to the fixed surfaces of the flow section. This high velocity flow region also facilitates the dislodgement or breaking away of particles from the silicon compound deposition on the tube walls which are then carried along with other particulates by the sodium flow through outlet 32 and into conduit 33.

The system 10 includes a flow meter 36 (FIG. 1) in conduit 33 to monitor flow through the system and preferably two pumps 37, which can be responsive to the output of flow meter 36, for circulating the liquid sodium through the system 10 independently of the parent or primary coolant system. Additionally, a plurality of pressure gages 38 and immersion thermocouples 39 are strategically positioned at several locations in the system 10 for establishing and monitoring operating conditions.

Figure 5:
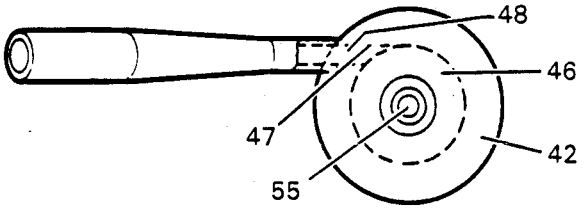
FIG. 5 is a top plan view of the separator shown in FIG. 4.
Figure 4:
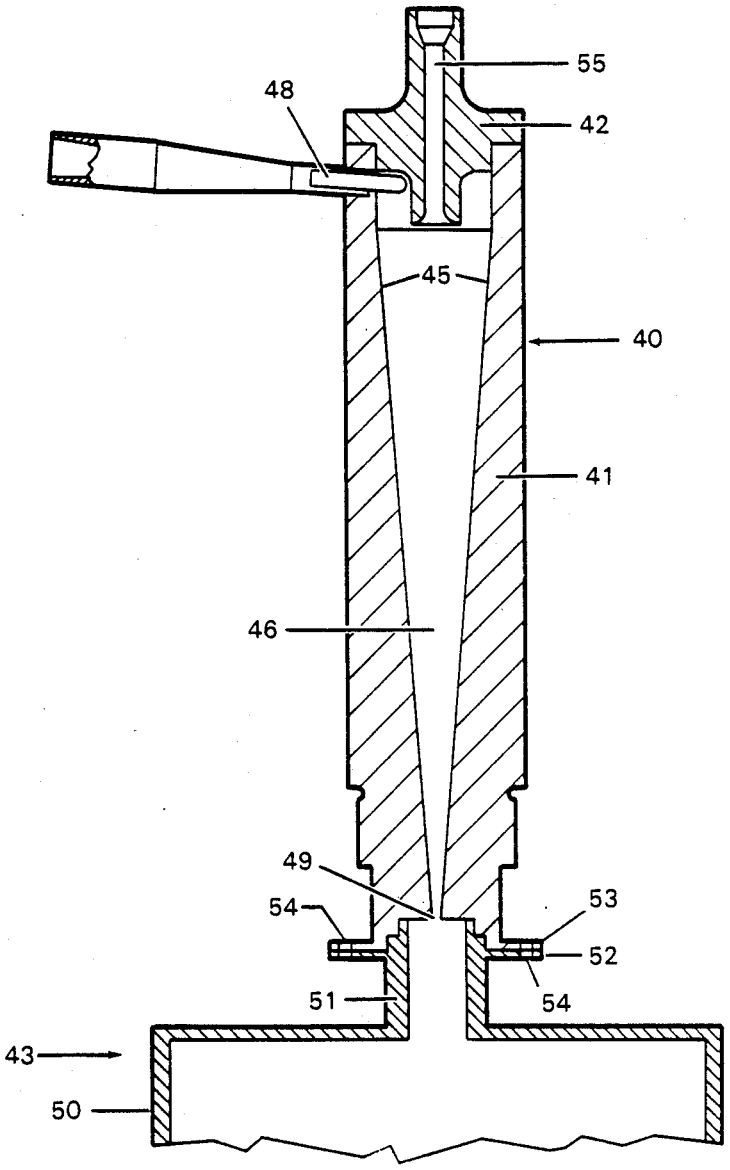
FIG. 4 is a longitudinal sectional view of a separator used in conjunction with the present invention.

Means are provided in the system 10 to separate and remove the entrained particulates from the liquid sodium, including those grown in the economizer/crystallizer 13 as well as those originating outside the system 10. Such means comprises a hydrocyclone, generally designated 40, located downstream of the economizer/crystallizer 13. As shown in FIG. 4, the hydrocyclone 40 comprises an elongated cylindrical body 4 surmounted at its upper end by an end cap 42 and connected at its lower end to a receptacle or collector 43. The body 41 is formed with an inner tapered wall 45 defining a conical passage 46 of progressively diminishing diameter in a downward direction. An opening or port 47 is formed in wall 45 adjacent the upper end of body 41 for receiving an inlet reducer member 48 suitably connected to the downstream end of conduit 33. As shown in FIGS. 4 and 5, the reducer member 48 is oriented tangentially to the upper end of passage 46 and at a slight downward attitude relative to a horizontal plane extending normal to the longitudinal axis of body 41. The particle entrained sodium passes through the reducer 48 and flows into the upper end of passage 46 in a downward tangential direction to impart a spiral motion of increasing angular velocity to the sodium flow downwardly through the passage 46. This motion propels the heavier particles toward the surface of tapered wall 45 and, via gravity, downwardly through the narrow outlet 49 into the collector 43.

The collector 43 comprises a generally cylindrical body 50 having a narrow neck portion 51 in open communication with the hydrocyclone passage 46 and provided with an annular flange 52 adapted to mate with a complementary flange 53 formed at the bottom of hydrocyclone 40. A suitable seal (not shown) may be interposed between flanges 52 and 53. Aligned openings 54 are formed in the two flanges 52 and 53 for the reception of suitable fasteners (not shown) for releaseably securing the collector 43 to the hydrocyclone 40. Thus, collector 43 is effective to permanently retain the separated particulates so that they cannot be re-entrained into the system. The collector 43 can be periodically detached for discarding the particulates accumulated therein.

The end cap 42 is welded or otherwise fixedly secured to the upper end of body 41 and is provided with an axial passage 55 connected to a conduit 56 for passing the cleansed sodium therethrough. The cleansed sodium is then conveyed via conduit 56 (FIG. 1) to an air cooler, generally designated 57, for further cooling the cleansed sodium and thereby controlling the thermal profile of the economizer 15 to which the cooled sodium is thereafter directed.

Figure 6:
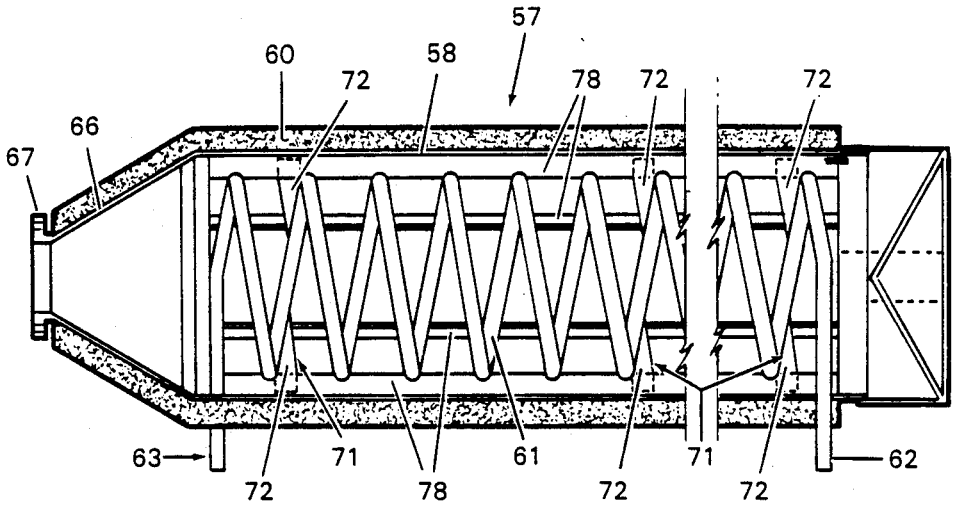
FIG. 6 is a longitudinal sectional view of a preferred form of cooling apparatus constructed in accordance with this invention.

As best shown in FIG. 6, the air cooler 57 comprises an elongated cylindrical shell 58 covered by a layer of thermal insulation 60. A tubular cooling coil 61 is suitably mounted within the shell 58 and is provided with an inlet 62 connected to conduit 56 and an outlet 63 connected to a conduit 65 leading to the inlet 25 of economizer 15. Shell 58 is formed with a tapered inlet end 66 terminating in a flange 67 for coupling, as by suitable fasteners (not shown), to the flange 68 of a blower 70 (FIG. 1). Thus, air under a predetermined pressure is blown across the several windings of coil 61 in heat exchange relation to the liquid sodium flowing therethrough.

In order to enhance cooling of the sodium in coil 61, a series of diffusers 71, each comprised of a plurality of stationary, radial vanes 72 are mounted at selected axially spaced intervals within shell 58 to impart a spiraling path to the flow of air as it traverses the coil 61. This spiraling motion imparted to the cooling air assures better distribution of the air and contact with the entire outer surfaces of the coil 61 through which the sodium flows.

Figure 8:
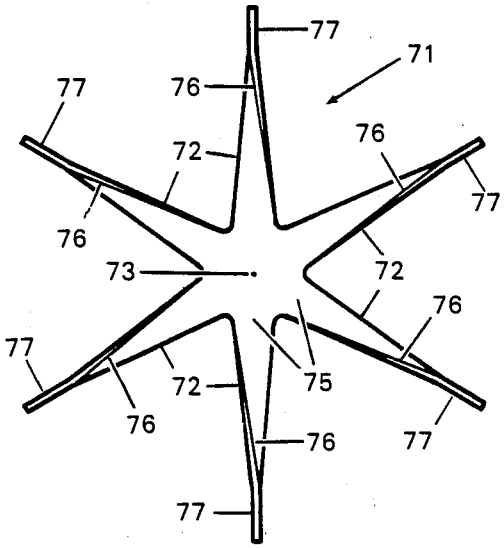
FIG. 8 is a front elevational view of the diffuser of FIG. 7.
Figure 7:
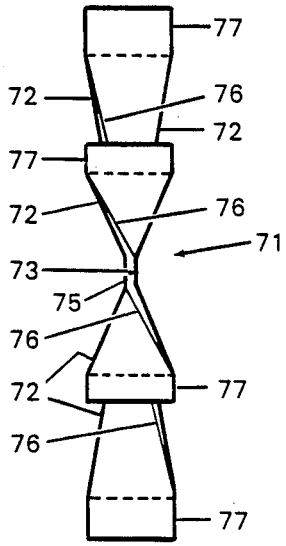
FIG. 7 is a side elevational view of a diffuser employed in the cooler used in conjuction with this invention.

As best shown in FIGS. 7 and 8, each diffuser 71 is of a unitary, one-piece construction fabricated by a stamping operation for example, with the several vanes 72 being integral with each other. The vanes 72 have a common axis 73 and are circumferentially spaced at equal distances from each other. Each vane 72 has a bent configuration with the inner portion 75 thereof lying in a plane substantially normal to axis 73 and then progressively bent, as at 76, toward its distal end to terminate in an end portion 77 substantially normal to the plane of the inner portion 75. This configuration directs the air flow impinging thereagainst into the desired spiraling motion. The outer end portion 77 of the vanes 72 are welded or otherwise fixedly attached to elongated structural members 78 affixed to the inner wall of the shell 58.

The cooler 57 cools and conditions the sodium for controlling the thermal profile of the economizer 15. The cooled sodium is conveyed via conduit 65 to the shell inlet 25 and then through annular passage 22 in heat exchange relation with the hot sodium flowing through axial passage 21. The cooled sodium flowing through passage 22 is reheated to parent system requirements and re-enters the parent or primary coolant system via shell outlet 26 and outlet 12.

In operation, hot sodium containing dissolved silicon enters the apparatus 13 and is rapidly cooled during flow through passage 21 in the economizer portion 15 to a temperature below the silicon saturation temperature. This cooled sodium temperature is maintained for a finite time by virtue of the low velocity flow region 35 in crystallizer portion 16. In lieu of providing a designated low velocity flow region 35 in crystallizer portion 16 in the illustrative embodiment for example, the desired retention time could be realized within an economizer or heat exchanger designed to effect a relatively slow rate of cooling. In either event, holding the temperature below the silicon saturation temperature for a predetermined time has been found desirable in this process in order to enhance optimum crystallization of silicon compounds. The flow rate of the sodium is then substantially increased during passage through the high velocity flow region defined by annular passageway 30. This also is important in imparting high turbulence to the sodium flow for promoting precipitation. Thus, cooling the sodium to a desired temperature range below the silicon saturation temperature, holding such temperature for a finite time, and then inducing high turbulence all contribute in causing the silicon to precipitate as silicon crystalline compounds predominantly on the walls of tube 27 and core member 28 adjacent passageway 30. The crystal deposits continue to increase in size during this process until the force of the sodium flow and the turbulence generated therein dislodges or breaks them from the tube wall as solid particulates.

The particle-laden sodium leaving the crystallizer portion 16 enters the hydrocyclone 40 whereat the particles, through centrifugal and gravitational forces, are substantially separated from the liquid sodium and deposited in the collector 43. The cleansed sodium is then conveyed through the cooler 57 for further reducing the temperature of the sodium in accordance with the desired thermal profile required across economizer portion 15. The sodium exiting the cooler 57 is then directed to the outer shell of the economizer 15 where it is reheated to parent or primary system requirements and re-enters the primary system.

For optimum silicon precipitation, crystal growth, and solid particle formation, the following is an example of desired parameters employed in the process of this invention. Using the temperatures earlier assumed, hot sodium with dissolved silicon enters the economizer 15 at about 1000° F. and is reduced therein from about 1° F. to 100° F. below the silicon saturation temperature of 900° F. to a temperature of not less than 800° F. This desired temperature is retained for a finite time from about 1 to 30 seconds. In order to establish the desired thermal profile across economizer portion 15, the temperature of the cleansed sodium is further reduced in cooler 57 to a temperature ranging from approximately 765° F. to 865° F. The temperature of this cooled sodium is then reheated during its passage through the shell side of economizer to a temperature of about 970° F. or otherwise within the requirements established for the primary coolant system.

From the foregoing, it is apparent that the objects of the present invention have been fully accomplished. As a result of this invention, a new and improved method and system is provided for removing silicon from a liquid sodium coolant. Reducing the temperature of the sodium to a temperature below the silicon saturation temperature and maintaining the sodium at such reduced temperature effects optimum precipitation in the form of silicon compound crystals on the surfaces of the flow channels. Also, imparting a high turbulence to the sodium flow under such reduced temperature conditions further promotes crystal growth and particle formation to large sizes which significantly enhance silicon removal from a primary sodium coolant system.

It is to be understood that the form of the invention herein shown and described is to be taken as an illustrative embodiment only of the same, and that various changes in the details and arrangement of components parts, as well as various procedural changes, may be resorted to without departing from the spirit of the invention.

We claim:

1. A method for removing silicon from a high temperature liquid sodium coolant containing dissolved silicon comprising: first cooling said high temperature sodium to a reduced temperature below the saturation temperature of silicon (Tsat), maintaining said sodium at said reduced temperature for a finite time, inducing high turbulence in the flow of such sodium at said reduced temperature to promote precipitation of silicon compond particulates, and hydrocycloning said liquid sodium thereby separating said particulates from said liquid sodium.

2. A method according to claim 1, wherein said high temperature liquid sodium coolant is reduced to a temperature in °F. between Tsat and Tsat-100.

3. A method according to claim 1, wherein said reduced temperature of said liquid sodium coolant is maintained for a period of from 1 to 30 seconds.

4. A method according to claim 1, wherein said hydrocycloned liquid sodium is further cooled and then reheated by heat exchange with said liquid sodium in said first cooling step.

5. A system for removing silicon from a flowing high temperature liquid sodium coolant containing dissolved silicon comprising: means for cooling at least a portion of said high temperature sodium to a reduced temperature below the saturation temperature of silicon, means for maintaining said sodium at said reduced temperature for a finite time, means for inducing high turbulence in the flow of said sodium at said reduced temperature to promote precipitation of silicon compound particulates, and means for separating said particulates from the major portion of said liquid sodium.

6. A system according to claim 5, including means for removing said particulates from said system.

7. A system according to claim 5, wherein said cooling means, temperature maintaining means and turbulence inducing means are incorporated in a single composite unit.

8. A system according to claim 7, wherein said cooling means comprises a heat exchanger forming a portion of said unit and having an axial passage for cooling said high temperature coolant passing therethrough.

9. A system according to claim 8, wherein said temperature maintaining means comprises a tube forming a portion of said unit and having a passage forming a continuation of said axial passage to define a low velocity flow region downstream of said axial passage.

10. A system according to claim 9, wherein said turbulence inducing means comprises a restricted passage within said tube defining a high velocity flow region downstream of said low velocity flow region.

11. A system according to claim 8, including means for further cooling said sodium coolant downstream of said separating means before returning said sodium coolant through said heat exchanger in heat transfer relation to said high temperature coolant.

12. An apparatus for precipitating impurities from a high temperature liquid containing dissolved impurities comprising: a shell, a tube mounted in said shell in radially spaced relation thereto and defining an annular passage there between having an inlet and an outlet, said tube defining an axial passage having an inlet and an outlet, said tube having an axial extension defining a chamber communicating with said axial passage outlet and forming a continuation thereof to provide a low velocity flow region, and a core member mounted in said extension adjacent the end thereof from said axial passage outlet defining a restricted passageway to provide a high velocity flow region.

13. An apparatus according to claim 12, wherein said annular passage has a lesser axial length than said axial passage.

14. An apparatus according to claim 12, wherein said core member is coaxially aligned with said extension whereby said restricted passage is annular in cross sectional configuration.

15. An apparatus for cooling a liquid comprising: an elongated shell having an inlet and an outlet adjacent the opposite ends thereof, a tubular coil mounted in said shell and having an inlet and outlet for conveying a liquid therethrough, means for delivering air under pressure through said shell in heat exchanger relation to said liquid, and means mounted in said shell for directing the flow of air lengthwise of said shell in a spiral path about said tubular coil.

16. An apparatus according to claim 15, wherein said directing means comprises a plurality of diffusers in axially spaced relation along the length of said shell.

17. An apparatus according to claim 16, wherein each diffuser comprises a plurality of vanes extending radially from the axis of said diffuser and circumferentially spaced from each other.

18. An apparatus according to claim 17, wherein each vane has an inner portion lying in a plane substantially normal to said diffuser axis and is gradually bent toward the distal end and terminating in an end portion lying in a plane parallel to a plane cut through said axis.

* * * * *